(12) United States Patent
Shafiee et al.

(10) Patent No.: US 10,805,117 B2
(45) Date of Patent: Oct. 13, 2020

(54) CHANNEL ESTIMATION IN OFDM COMMUNICATION SYSTEMS

(71) Applicant: Microchip Technology Incorporated, Chandler, AZ (US)

(72) Inventors: Hamid Shafiee, Irvine, CA (US); Mohsen Pourkhaatoun, Laguna Niguel, CA (US); Kiran Gowda, Irvine, CA (US); Siddharth Shetty, Irvine, CA (US); Esmael Heidari, Mission Viejo, CA (US); Ali Fard, Irvine, CA (US); Rahim Bagheri, Poway, CA (US); Masoud Djafari, Laguna Hills, CA (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 15/642,348

(22) Filed: Jul. 6, 2017

(65) Prior Publication Data
US 2018/0013591 A1  Jan. 11, 2018

Related U.S. Application Data

(60) Provisional application No. 62/359,352, filed on Jul. 7, 2016.

(51) Int. Cl.
*H04L 25/02* (2006.01)
*H04L 27/26* (2006.01)
*H04L 25/03* (2006.01)

(52) U.S. Cl.
CPC ........ *H04L 25/0204* (2013.01); *H04L 25/022* (2013.01); *H04L 25/0212* (2013.01); *H04L 25/0216* (2013.01); *H04L 25/03019* (2013.01); *H04L 27/265* (2013.01); *H04L 27/2647* (2013.01); *H04L 2025/03414* (2013.01)

(58) Field of Classification Search
CPC ............. H04L 25/0204; H04L 25/0212; H04L 25/03019; H04L 27/265; H04L 2025/03414
See application file for complete search history.

(56) References Cited

U.S. PATENT DOCUMENTS

| | | | |
|---|---|---|---|
| 2006/0078075 A1* | 4/2006 | Stamoulis | H04L 25/03171 375/346 |
| 2007/0206689 A1 | 9/2007 | Koo et al. | 375/260 |
| 2008/0273611 A1* | 11/2008 | Ghosh | H04L 27/2605 375/260 |

(Continued)

OTHER PUBLICATIONS

Lee, You-Seok et al., "Iterative Extrapolation for Channel Equalization in DVB-T Receivers," IEEE Transactions on Broadcasting, vol. 54, No. 3, pp. 461-467, Sep. 1, 2008.

(Continued)

*Primary Examiner* — Sam K Ahn
*Assistant Examiner* — Amneet Singh
(74) *Attorney, Agent, or Firm* — Slayden Grubert Beard PLLC

(57) ABSTRACT

Embodiments of the present disclosure include an OFDM receiver circuit, which includes an FFT circuit configured to calculate an FFT of a plurality of sample values received by the receiver circuit, and a smoothing circuit configured to identify equalizer coefficients for the sample values by truncating portions of an impulse response of the FFT.

15 Claims, 3 Drawing Sheets

(56) References Cited

U.S. PATENT DOCUMENTS

| | | | |
|---|---|---|---|
| 2009/0274237 A1* | 11/2009 | Zelst | H04B 7/0434 |
| | | | 375/267 |
| 2010/0142608 A1* | 6/2010 | Kim | H04L 1/005 |
| | | | 375/232 |
| 2010/0202504 A1* | 8/2010 | Murali | H04L 25/022 |
| | | | 375/232 |
| 2014/0269883 A1 | 9/2014 | Thompson et al. | 375/232 |

OTHER PUBLICATIONS

International Search Report and Written Opinion, Application No. PCT/US2017/041106, 14 pages, dated Sep. 14, 2017.

\* cited by examiner

CHANNEL ESTIMATION IN OFDM COMMUNICATION SYSTEMS

RELATED PATENT APPLICATION

This application claims priority to commonly owned U.S. Provisional Patent Application No. 62/359,352; filed Jul. 7, 2016, which is hereby incorporated by reference herein for all purposes.

TECHNICAL FIELD

The present disclosure relates to wireless data communication systems and, in particular, orthogonal frequency domain multiplexing (OFDM) systems and channel estimation thereof.

BACKGROUND

OFDM systems encode and decode digital data on multiple carrier frequencies. OFDM may form the basis of wireless communication protocols such as IEEE 802.11-compliant systems. Performance of wireless systems may be evaluated based upon the range of signals thereof and data transfer rates thereof that may be reliably provided for intended applications. Receiver sensitivity may refer to the minimum input power required for a receiver (RX) to perform at or better than specified requirements. The specified requirements may be made by the relevant IEEE standard. Currently, the preferred signaling technique in wireless communication is OFDM. An OFDM receiver requires the wireless channel to be estimated prior to data demodulation.

SUMMARY

Figure 1:
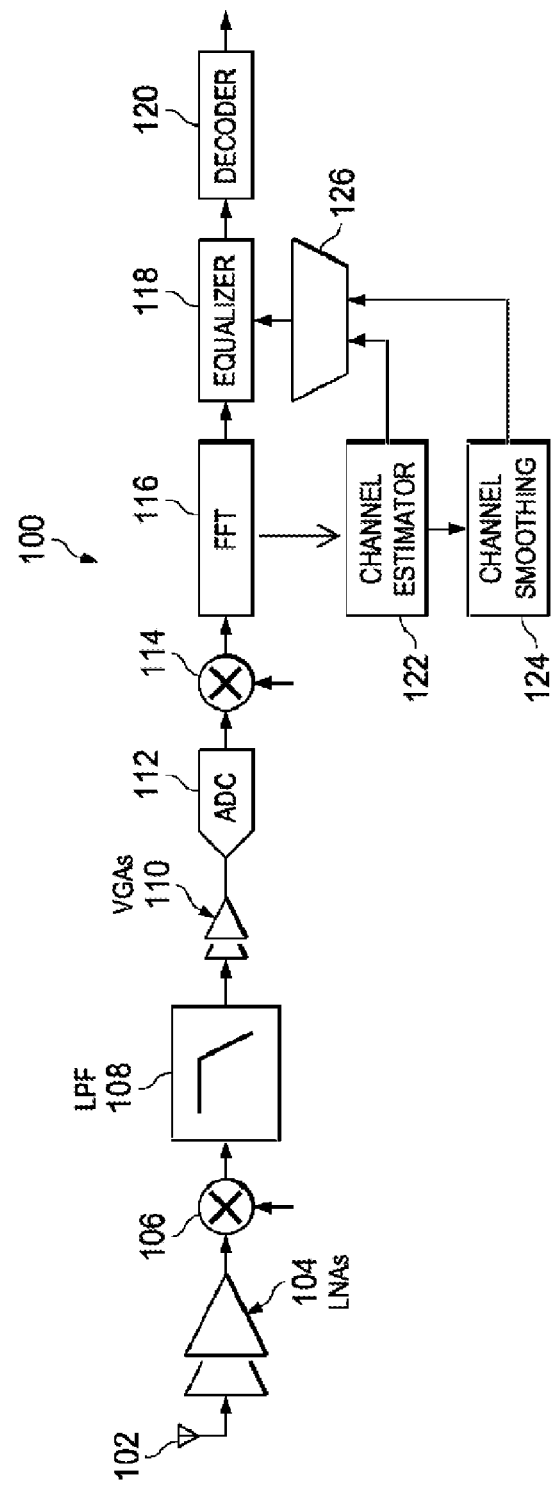
FIG. 1 is an illustration of an example system 100 for improved channel estimation, according to embodiments of the present disclosure.

Embodiments of the present disclosure include an OFDM receiver circuit, comprising an FFT circuit and a smoothing circuit. The FFT circuit may be configured to calculate an FFT of a plurality of sample values received by the receiver circuit. In combination with any of the above embodiments, the smoothing circuit may be configured to identify equalizer coefficients for the sample values by truncating portions of an impulse response of the FFT. In combination with any of the above embodiments, the smoothing circuit may be further configured to identify the equalizer coefficients by truncating portions of the impulse response of the FFT beyond a defined length of the impulse response. In combination with any of the above embodiments, the smoothing circuit may be further configured to identify the equalizer coefficients by performing an inverse FFT on channel frequency response of the plurality of sample values, truncating portions of the impulse response in results of the inverse FFT, and performing an FFT on results of the truncation. In combination with any of the above embodiments, the smoothing circuit is further configured to estimate a value of a null sub-carrier in a channel frequency response of the plurality of sample values, perform an inverse FFT on channel frequency response of the plurality of sample values with the estimated value of the null-subcarrier, truncate portions of the impulse response in results of the inverse FFT, and perform an FFT on results of the truncation. In combination with any of the above embodiments, the smoothing circuit may be further configured to estimate a value of a null sub-carrier in a channel frequency response of the plurality of sample values, perform an inverse FFT on channel frequency response of the plurality of sample values with the estimated value of the null-subcarrier, truncate portions of the impulse response in results of the inverse FFT, perform an FFT on results of the truncation, evaluate whether results of the truncation have converged, and, based on whether results of the truncation have converged, determine whether to repeat performance of the inverse FFT, truncation, and performance of the FFT. In combination with any of the above embodiments, the smoothing circuit may be further configured to estimate a value of a null sub-carrier in a channel frequency response of the plurality of sample values, perform an inverse FFT on channel frequency response of the plurality of sample values with the estimated value of the null-subcarrier, truncate portions of the impulse response in results of the inverse FFT, perform an FFT on results of the truncation, and, based on a determination that results of the truncation have not converged, repeat performance of the inverse FFT, truncation, and performance of the FFT using the channel frequency response of the plurality of sample values and a value of the null sub-carrier resulting from previous performance of the inverse FFT, truncation, and performance of the FFT. In combination with any of the above embodiments, the smoothing circuit may be further configured to truncate portions of the impulse response by applying a least-square estimation matrix operation to the impulse response of the FFT. In combination with any of the above embodiments, the smoothing circuit may be further configured to truncate portions of the impulse response by finding a channel impulse response as the least-square solution to an over-determined set of linear equations. In combination with any of the above embodiments, the smoothing circuit may be further configured to perform an inverse FFT and truncate portions of the impulse response by applying the impulse response of the plurality of samples to a matrix operation dimensionally dependent upon expected channel response without null-subcarriers and including an inverse Fourier transform matrix. In combination with any of the above embodiments, the smoothing circuit may be further configured to estimate a value of a null sub-carrier in a channel frequency response of the plurality of sample values by applying a least-square estimation matrix operation to the impulse response of the FFT.

Embodiments of the present disclosure may include any of the smoothing circuits discussed above. Furthermore, embodiments of the present disclosure may include systems including any of the receiver circuits discussed above. Also, embodiments of the present disclosure may include methods performed by any of the elements discussed above.

DETAILED DESCRIPTION

FIG. 1 is an illustration of an example system 100 for improved channel estimation, according to embodiments of the present disclosure. In one embodiment, system 100 may provide improved channel estimation for OFDM-based communication. Channel estimation may be performed in a receiver of system 100, illustrated in FIG. 1. The channel estimation may be improved in the embodiments of system 100 compared to other OFDM receivers. System 100 may be an improved system which has a lower receiver sensitivity.

System 100 may estimate the wireless channel before data is demodulated. The OFDM receiver may use known transmitted symbols at the beginning of a given packet (known as the preamble) to estimate the wireless channel. Since channel estimation is performed using noisy received samples, the resulting estimate is inherently noisy. The elements of FIG. 1 may be implemented by any suitable combination of digital circuitry, or instructions for execution by a processor.

A radio-frequency (RF) signal may be received by an antenna 102. The received signal may be amplified using one or more low-noise amplifiers (LNA) 104 and down-converted to a baseband signal. The waveform may then be filtered with a low-pass filter (LPF) 108 and amplified again using one or more variable gain amplifiers (VGA) 110. The signal may be down-converted from RF to baseband using a mixer circuit 106.

The resultant signal may be sampled with analog-to-digital converters (ADC) 112. The signal may be adjusted with a multiplier circuit 114. Circuits 106, 114 may include time-domain complex multipliers configured to correct for the effect of the carriers frequency offset. A Fast Fourier Transform (FFT) circuit 116 may apply an FFT to the signal and route the results to a channel estimator circuit 122. The output of the channel estimator circuit 122 may be routed to a multiplexer 126 and to a channel smoothing circuit 124. The output of channel smoothing circuit 124 may be routed to multiplexer 126. The output of FFT circuit 116 and multiplexer 126 may be routed to an equalizer circuit 118, whose output may be routed to a decoder circuit. FFT operations may be performed on a 64-sample block of data as-is done in some wireless communication standards such as IEEE 802.11n. Equalization may be performed in the frequency-domain. Decoding may yield the original, transmitted sequence.

Equalizer circuit 118 may calculate coefficients after the channel frequency-response is found by estimator circuit 122. The channel frequency-response may include output of estimator circuit 122 into smoothing circuit 124. Smoothing circuit 124 may mitigate noise effects. This may update the estimate of the channel that was made by estimator circuit 122. The initial channel estimate made by estimator circuit 122 may be found in the frequency domain. Smoothing circuit 124 may apply an Inverse Fast Fourier Transform (IFFT) to the FFT signal. The number of samples may depend upon the communications protocols used by system 100. For example, system 100 may be compliant with IEEE 802.11 a/g/n WIFI standards. Smoothing circuit 124 may apply the IFFT to a 64-sample block result from FFT 116 to result in a 64-sample time-domain response. In such a case, the impulse response may be expected to only have N non-zero values, where N<64. Any non-zero values at positions outside the expected range may be due to noise. In one embodiment, estimator circuit 122 may set some of such values to zero. After returning to the frequency domain, an improved channel estimate may be obtained. This may be referred to as time-domain-truncation (TDT). To apply a 64-sample IFFT, channel frequency response at 64 sub-carriers may be needed. However, the received signal might not provide data to estimate some of the sub-carriers. In one embodiment, the response at these sub-carriers, referred to as "null" sub-carriers, may be obtained before the TDT can be performed.

Although operations of smoothing circuit 124 are described in the present disclosure, in various embodiments the operation and configuration of smoothing circuit 124 to apply an IFFT and perform TDT may be implemented by any other suitable portion of system 100, such as by estimator circuit 122.

FIGS. 2A-2D is an illustration of example operation of system 100, according to embodiments of the present disclosure. FIGS. 2A-2D may illustrate TDT.

Figure 2A:
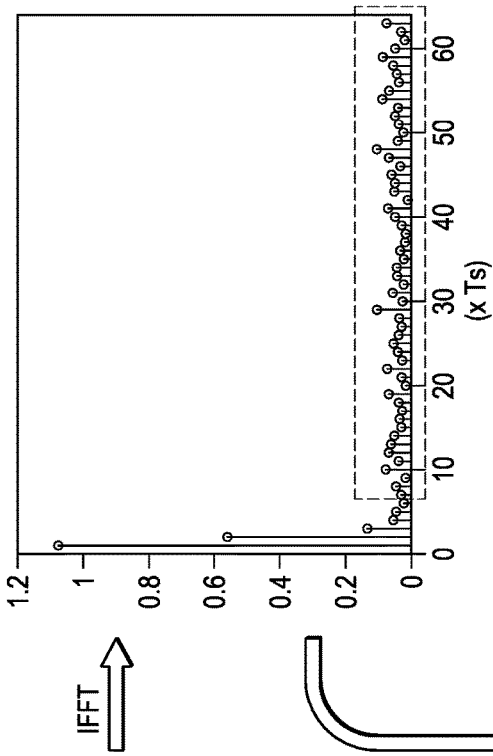
FIGS. 2A-2D are an illustration of example operation of system 100, according to embodiments of the present disclosure.

In FIG. 2A, channel frequency response as generated by estimator circuit 122 may be shown. The zig-zag line in (a) may represent the response as-generated. Superimposed over the zig-zag line in (a) is a smoother curve that may represent the true or ideal channel estimate. The deviation between the two plots may be caused by noise that will be handled by embodiments of the present disclosure while performing TDT.

Figure 2B:
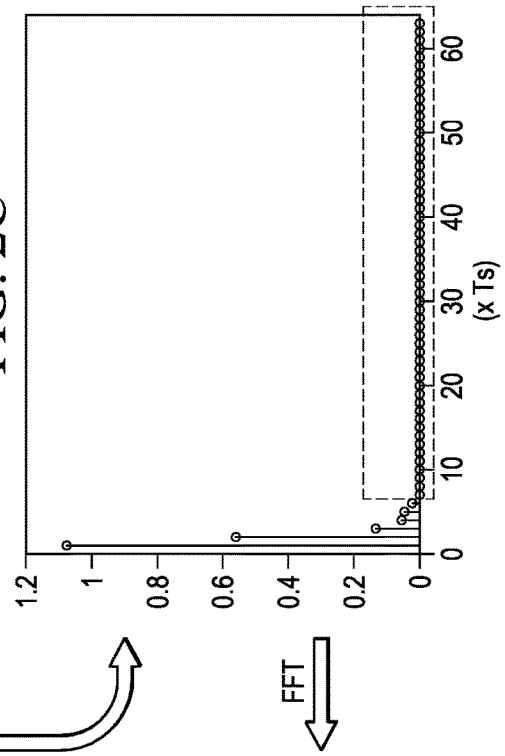

In FIG. 2B, an IFFT may have been applied to the channel frequency response (zig-zag line) from FIG. 2A. The result may be time-domain channel impulse response. As shown in FIG. 2B, various channels may have a non-zero response as the channel number grows higher. However, the length of the channel of the estimate might be expected to be a fewer number of samples. The data present in all locations throughout the 64-sample result may be due to the effects of noise. The x-component of the graph may be expressed in multiples of the sampling period (Ts).

Figure 2D:
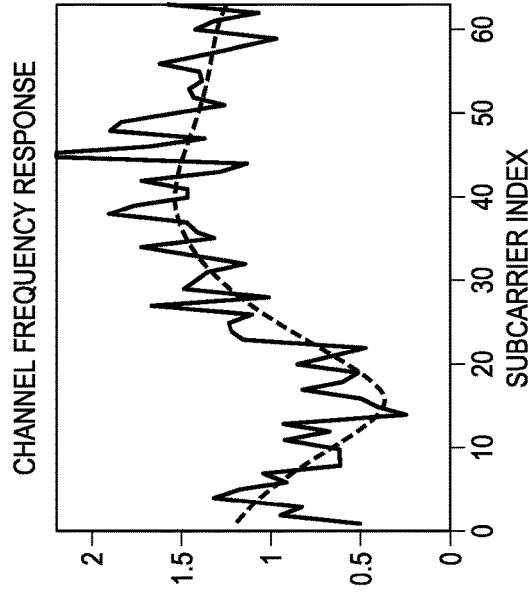
Figure 2C:
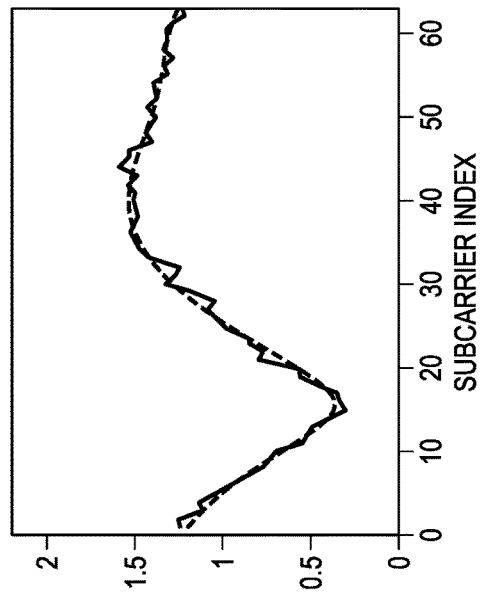

In FIG. 2C, smoothing circuit 124 may apply a mask to cancel all non-zero values for channels above a given index number. In the example of FIGS. 2A-2D, the mask may be applied to all channels in the marked rectangle. The mask may be implemented by editing the resulting data and setting the resulting data to zero. The size of the mask may be chosen according to an expected size of valid samples, which may vary according to the particular wireless application in which system 100 is used. For example, different masks may be chosen when using system 100 in WIFI or cellular voice applications. The size of the mask may further be chosen according to expected operating environments. Each such application may have a different ideal impulse channel response. The size of the mask may be selected to have a length corresponding to a worst-case number of samples that would be accepted to perform symbol reconstruction.

In FIG. 2D, smoothing circuit 124 may apply an FFT to the results from FIG. 2C, yielding frequency-domain data. In FIG. 2D, the zig-zag line, representing the actual frequency-domain data from the FFT applied to the data from FIG. 2C, is much closer to the smoother curve representing the true, ideal, or improved channel estimate when compared with FIG. 2A.

Data for various sub-channels and impulse response may be represented using a vector of coefficients.

Figure 3:
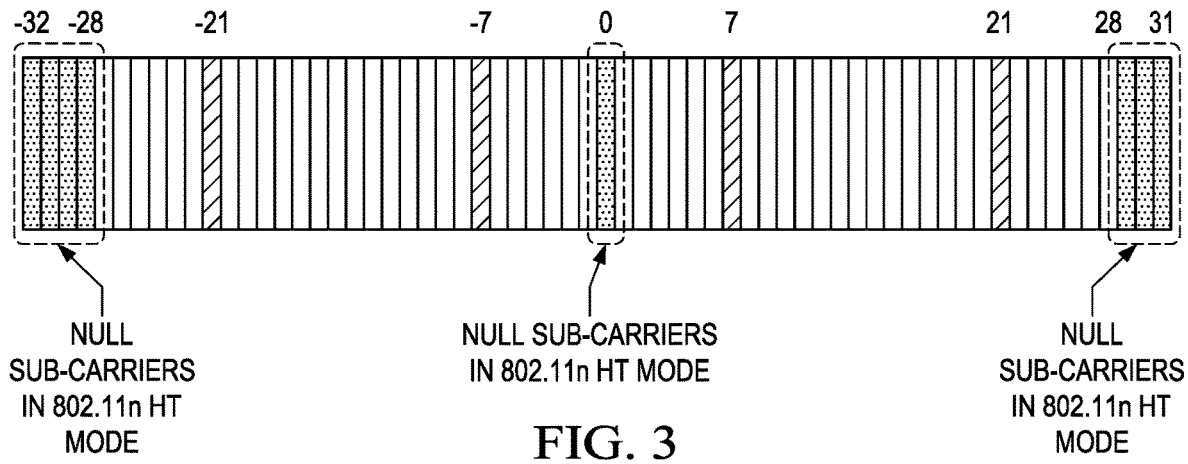
FIG. 3 illustrates null sub-carriers, according to embodiments of the present disclosure.

FIG. 3 illustrates null sub-carriers, according to embodiments of the present disclosure.

In some implementations of TDT, smoothing circuit 124 may require an estimate of all sub-channels. All positions might need information reflecting an estimate. If some are missing, smoothing circuit 124 might not be able to fully perform its tasks. A 64-position FFT may be a typical use case with respect to the data that will be used. A null sub-carrier may include those positions in the FFT for which an estimate might not be available. FIG. 3 illustrates example positions of null sub-carriers for a particular application wherein system 100 is used in IEEE 802.11n HT mode. When 802.11a is used, for example, more null sub-carriers may occur. In the example of 802.11n HT mode, the null sub-carriers may be in positions 0, 28 through 31, and negative 28 through negative 31. Prior to applying an IFFT, the null-subcarriers may be initialized in one embodiment. The null sub-carriers may be estimated through an iterative process.

Figure 4:
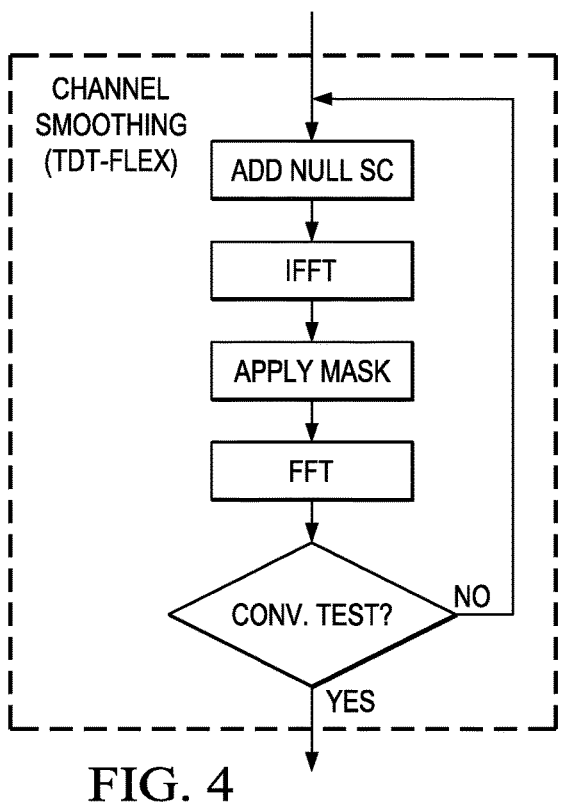
FIG. 4 illustrates operation of the system to perform an iterative time domain truncation algorithm, according to embodiments of the present disclosure.

FIG. 4 illustrates operation of the system to perform an iterative time domain truncation (iTDT) algorithm, according to embodiments of the present disclosure. This may be performed, for example, by smoothing circuit 124. The iTDT operation shown in FIG. 4 may augment the TDT process of FIG. 3 to account for the null-subcarriers and the lack of information therein. The process of iTDT may be repeated until the resulting response in the frequency domain converges.

To the data provided as a result of the FFT, first a value may be added to the null-subcarriers. In one embodiment, the value may be set to zero. In another embodiment, the value may be set to the value of a non-null-subcarrier neighbor. These may be estimations or guesses for the null sub-carrier.

Subsequently, the IFFT may be applied to the resulting data, and then the mask applied to the result of the IFFT, and finally an FFT applied to the result of the masking. Upon a first iteration, the iTDT process may repeat. Except for the last iteration, the original data from the first FFT process may be used, except for data for the null-subcarriers. For the null-subcarriers, the data from the previous iteration may be used.

Upon the completion of every iteration, the process may determine whether the iTDT process has converged to a stable value. If the iTDT process has converged, then the coefficients at the data sub-channels are then released as the updated channel frequency response. If the iTDT process does not converge and the maximum number of iterations allowed has not reached, another iteration may be performed. At the end of each cycle or iteration, except for the null sub-carriers, the initial frequency responses at other sub-channels may be restored and the process repeats.

The required number of iterations to reach convergence may depend on the channel, wireless protocol, and noise conditions. Selecting a fixed number of iterations which works optimally in all settings may not be possible. If the number of iteration is set too low, the estimate of the nulled sub-carriers might not be sufficiently accurate. This may impact the accuracy of the channel coefficients. If, on the other hand, the number of iterations is set too high, many OFDM symbols are demodulated using the initial (noisier) channel estimate while the iterations process.

In the iTDT algorithm, a convergence test may be performed at the end of each iteration. The convergence test may check whether the present iteration results differ from previous iteration results. If the differences are estimated to be relatively small, below a given threshold, then convergence may be identified. The values of a given iteration may be evaluated by, for example, summing the power at all coefficients at the null sub-carriers and comparing the resultant value against a threshold. A cap on the number of iterations may be enforced, regardless of convergence. The iTDT algorithm may allow the number of iterations to adapt to channel conditions.

In one embodiment, to avoid additional throughput delays, multiple OFDM symbols at the beginning of the packet may be processed using the initial channel estimate until updated coefficients become available.

Figure 5:
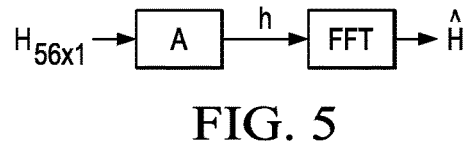
FIG. 5 illustrates an example embodiment of operation of the system to perform a least-square time-domain truncation, according to embodiments of the present disclosure.

FIG. 5 illustrates an example embodiment of operation of the system to perform a least-square time-domain truncation (LSTDT), according to embodiments of the present disclosure. This may be performed, for example, by smoothing circuit 124. While an iterative approach may work well, while iterations are occurring data arriving at a receiver may be passed-through without smoothing. LSTDT may be an alternate non-iterative method to yield similar improved performance but with higher computational complexity compared to iTDT. In LSTDT, the channel impulse response is found as the least-squared solution to an overdetermined set of linear equations. For example, if in a 64-channel OFDM system such as IEEE 802.11n, the 56 elements of the channel are an input (H), as a block of 56×1. The input is multiplied by a matrix of size 56×L, where L is expected length of the impulse response. The result, before an FFT is applied, may be given as h, a 1×L result. An FFT operation may then then yield the updated channel frequency response. In FIG. 5, the operation may be specified as $$A_{L\times 56}=(G_{L\times 56}{}^{H}G_{56\times L})^{-1}G_{L\times 56}{}^{H}$$

G may be the inverse Fourier transform matrix, with rows corresponding to null-subcarriers removed.

Figure 6:
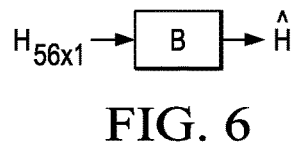
FIG. 6 is illustrates an example embodiment of operation of the system to perform a least-square time-domain truncation in combination with matrix-based FFT operation, according to embodiments of the present disclosure.

FIG. 6 is illustrates an example embodiment of operation of the system to perform a least-square time-domain truncation in combination with matrix-based FFT operation, according to embodiments of the present disclosure. This may be performed, for example, by smoothing circuit 124. The FFT operation of FIG. 5 may be implemented itself as a matrix operation. Consequently, the operation may be performed with a single matrix multiplication operation. The input (H) may be passed to a matrix operation B, wherein B is a matrix to perform the FFT operation and the matrix A from FIG. 5. Thus, in the example of IEEE 802.11 mentioned above, the size of B may be 64×56.

Figure 7:
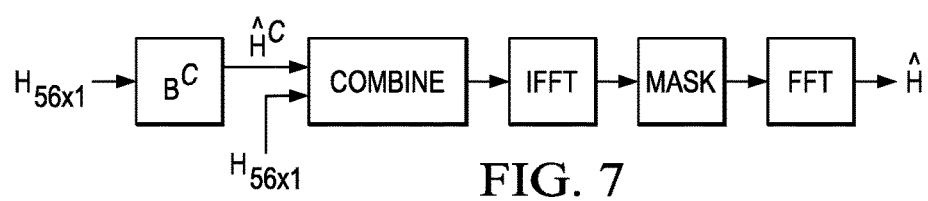
FIG. 7 illustrates an example embodiment of operation of the system to perform a least-square estimate to estimate the null-subcarriers, according to embodiments of the present disclosure.

FIG. 7 illustrates an example embodiment of operation of the system to perform a least-square estimate to estimate the null-subcarriers, according to embodiments of the present disclosure. This may be performed, for example, by smoothing circuit 124. In this case, least-squares estimation may be performed only on the subchannels corresponding to the null-subcarriers, while the other steps from FIGS. 2A-2D are performed.

The input H and the matrix operation $B_{8\times 56}{}^{C}$ may generate the least-square estimate. This matrix operation may be substantially smaller than the least-square operation of FIG. 6. This may be combined with the original input H. Subsequently, the IFFT, mask, and FFT may be applied.

The matrix operations above may require formulating the channel smoothing problem in matrix form, which may require specific hardware to efficiently implement.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

The invention claimed is:

1. An OFDM receiver circuit, comprising:
   a Fast Fourier Transform (FFT) circuit configured to calculate an FFT of a plurality of sample values received by the receiver circuit;
   a channel estimator circuit configured to receive the FFT and generate an estimated value of subcarriers including null-subcarriers; and
   a smoothing circuit configured to:
      use the estimated value; and
      identify equalizer coefficients for the plurality of sample values by truncating portions of an impulse response of the FFT;
      perform an inverse FFT on channel frequency response of the plurality of sample values with the estimated value of the null-subcarrier;
      truncate portions of the impulse response in the results of the inverse FFT;
      perform an FFT on results of the truncation;
      evaluate whether results of the truncation have converged;
      based on whether the results of the truncation have converged, determine whether to repeat performance of the inverse FFT, the truncation, and performance of the FFT on the results of the truncation;
   wherein evaluation of whether the results of the truncation have converged includes summing power of all coefficients at the null-subcarriers and comparing a resulting sum of only the coefficients at the null-subcarriers to a threshold.

2. The OFDM receiver circuit of claim 1, wherein the smoothing circuit is further configured to:
   estimate a value of a null sub-carrier in a channel frequency response of the plurality of sample values by selectively applying a least-square estimation matrix operation only to subchannels corresponding to null-subcarriers of the impulse response of the FFT; and
   combine the estimated value of the null sub-carrier with the plurality of sample values to yield a combination matrix; and
   perform another inverse FFT on the combination matrix to yield an inverted FFT matrix;

apply a mask to the inverted FFT matrix to channels beyond a threshold to yield a masked matrix to truncate portions of the impulse response of the FFT; and
apply the FFT to the masked matrix.

3. The OFDM receiver circuit of claim 1, wherein the smoothing circuit is further configured to identify the equalizer coefficients by truncating portions of the impulse response of the FFT beyond a defined length of the impulse response.

4. The OFDM receiver circuit of claim 1, wherein the smoothing circuit is further configured to identify the equalizer coefficients by performing the inverse FFT on channel frequency response of the plurality of sample values, truncating portions of the impulse response in results of the inverse FFT, and performing the FFT on results of the truncation.

5. The OFDM receiver circuit of claim 1, wherein the smoothing circuit is further configured to truncate portions of the impulse response by applying a least-square estimation matrix operation to the impulse response of the FFT.

6. The OFDM receiver circuit of claim 1, wherein the smoothing circuit is further configured to truncate portions of the impulse response by finding a channel impulse response as the least-square solution to an over-determined set of linear equations.

7. The OFDM receiver circuit of claim 1, wherein the smoothing circuit is further configured to perform an inverse FFT and truncate portions of the impulse response by applying the impulse response of the plurality of samples to a matrix operation dimensionally dependent upon expected channel response without null-subcarriers and including an inverse Fourier transform matrix.

8. A system, comprising:
a receiver circuit; and
a smoothing circuit configured to:
  receive a plurality of sample values from the receiver circuit;
  identify equalizer coefficients for the plurality of sample values by truncating portions of an impulse response of an FFT;
estimate a value of each null sub-carriers in a channel frequency response of the plurality of sample values;
  perform an inverse FFT on channel frequency response of the plurality of sample values with the estimated value of each of the null-subcarriers;
  truncate portions of the impulse response in results of the inverse FFT;
  perform another FFT on the results of the truncation;
  evaluate whether the results of the truncation have converged, including summing power of all coefficients at the null-subcarriers and comparing a resulting sum of only the coefficients at the null-subcarriers to a threshold; and
  based on whether the results of the truncation have converged, determine whether to to repeat performance of the inverse FFT, truncation, and performance of the another FFT on the results of the truncation.

9. The system of claim 8, wherein the smoothing circuit is further configured to:
  estimate a value of a null sub-carrier in a channel frequency response of the plurality of sample values by selectively applying a least-square estimation matrix operation only to subchannels corresponding to null-subcarriers of the impulse response of the FFT;
  combine the estimated value of the null sub-carrier with the plurality of sample values to yield a combination matrix;
  perform another inverse FFT on the combination matrix to yield an inverted FFT matrix;
  apply a mask to the inverted FFT matrix to channels beyond a threshold to yield a masked matrix to truncate portions of the impulse response of the FFT; and
  apply the FFT to the masked matrix.

10. The system of claim 8, wherein the smoothing circuit is further configured to identify the equalizer coefficients by truncating portions of the impulse response of the FFT beyond a defined length of the impulse response.

11. The system of claim 8, wherein the smoothing circuit is further configured to identify the equalizer coefficients by performing the inverse FFT on channel frequency response of the plurality of sample values, truncating portions of the impulse response in results of the inverse FFT, and performing the another FFT on results of the truncation.

12. The system of claim 8, wherein the smoothing circuit is further configured to truncate portions of the impulse response by applying a least-square estimation matrix operation to the impulse response of the FFT.

13. The system of claim 8, wherein the smoothing circuit is further configured to truncate portions of the impulse response by finding a channel impulse response as a least-square solution to an over-determined set of linear equations.

14. The system of claim 8, wherein the smoothing circuit is further configured to perform the inverse FFT and truncate portions of the impulse response by applying the impulse response of the plurality of samples to a matrix operation dimensionally dependent upon expected channel response without the null-subcarriers and including an inverse Fourier transform matrix.

15. A method, comprising:
  receiving a plurality of sample values from a receiver circuit;
  identifying equalizer coefficients for the plurality of sample values by truncating portions of an impulse response of an FFT;
  estimating a value of each null sub-carriers in a channel frequency response of the plurality of sample values;
  performing an inverse FFT on channel frequency response of the plurality of sample values with the estimated value each of the null-subcarriers;
  truncating portions of the impulse response in results of the inverse FFT;
  performing another FFT on the results of the truncation;
  evaluating whether the results of the truncation have converged, including summing power of all coefficients at the null-subcarriers and comparing a resulting sum of only the coefficients at the null-subcarriers to a threshold; and
  based on whether the results of the truncation have converged, determining whether to repeat performance of the inverse FFT, truncation, and performance of the another FFT.

* * * * *